July 10, 1956 — J. V. MAKI — 2,754,011
CABLE GUIDES FOR CRANE BOOMS
Filed Jan. 5, 1955
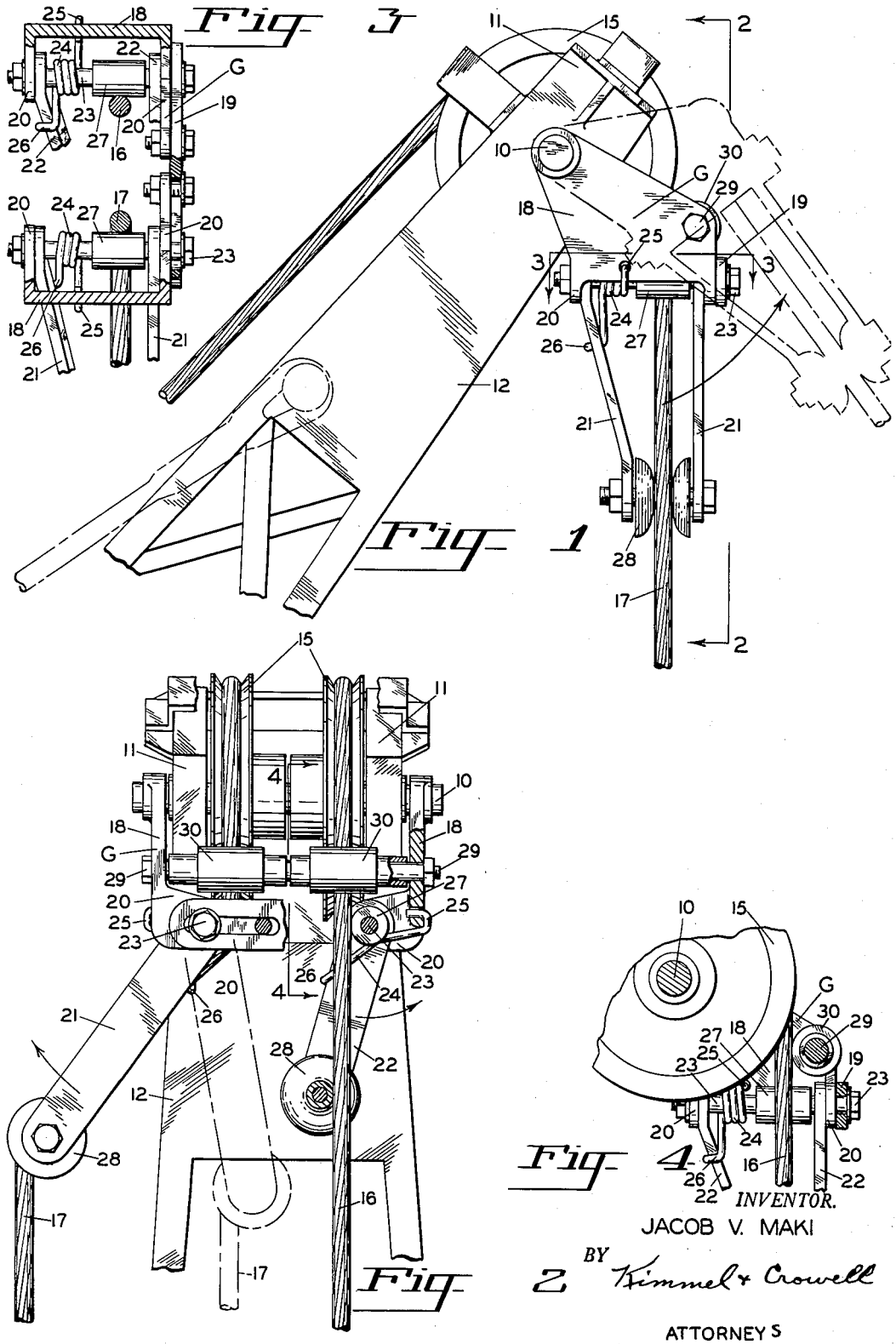
INVENTOR.
JACOB V. MAKI
BY Kimmel & Crowell
ATTORNEYS United States Patent Office 2,754,011
Patented July 10, 1956

2,754,011
CABLE GUIDES FOR CRANE BOOMS
Jacob V. Maki, Portland, Oreg.
Application January 5, 1955, Serial No. 479,949
6 Claims. (Cl. 212—1)

This invention relates to cable guides and is particularly adapted to guide and separate cables used on booms for cranes, particularly where clam shovels are being operated.

In the operation of clam shovels and the like, the lifting cable and the operating cable frequently become entangled with one another, usually one of the cables is in a slacked off condition and tends to wrap about the cable that is in a taut condition, or both cables may be slacked off causing them to wrap around one another.

With this new and improved guide, the cables are moved apart from one another under the above conditions so that they will not become entangled with each other.

When both cables are in a taut condition the guide permits them to align with the sheaves on the boom, but as soon as one or both of the cables become slack they are automatically moved away from one another by this new and improved cable guide mechanism.

Other and further objects and advantages of this invention will become more apparent from a consideration of the following specification when read in conjunction with the annexed drawing, in which:

Figure 1 is a fragmentary side elevational view of the upper end of a crane boom, having this new and improved cable guide mounted thereon.

Figure 2 is a front elevational view, partly in section, of the upper end of the boom and guide, taken on the vertical plane of line 2—2 of Figure 1, looking in the direction of the arrows.

Figure 3 is a fragmentary detail plan view taken on the horizontal plane of line 3—3 of Figure 1, looking in the direction of the arrows.

Figure 4 is a fragmentary detail view, taken on the vertical plane of line 4—4 of Figure 2, looking in the direction of the arrows.

Referring more specifically to the drawing, this new and improved cable guide G is indicated as pivotally connected to the cross shaft 10, which is fixedly secured to the upper and outer end 11 of the boom 12 of a conventional crane. The cable sheaves 15 are journaled on the shaft 10 and have the cables 16 and 17 trained thereabout.

The guide G consists of side plates 18, which embrace the upper end 11 of the boom, as best illustrated in Figures 1 and 2, which may be formed in one piece or they may be of two separate pieces connected together by the bar 19. Inwardly disposed brackets 20 form part of the plates 18. These brackets are adapted to support the downwardly extending arms 21 and 22 which are pivotally connected to the brackets by way of the shafts or bolts 23.

Springs 24 are also associated with the said bolts and are adapted to force the arms outwardly from the center line of the boom, as indicated by the arm 21, Figure 2. The ends 25 of the springs bear against the side of the plates 18, while the opposite ends 26 of the springs bear against the side of the arms 21 and 22.

Rollers 27 are journaled on the shafts 23 against which the cables 16 and 17 are adapted to be guided, aligning the cables with the sheaves 15. Journaled on the lower ends of the arms 21 and 22 are sheaves or rollers 28 through which the cables are threaded. When the cables are in a taut condition the cable moves the arms to the position shown of that of the arm 22 in Figure 2, but when the cables are slacked off the arms are moved to the position of the arm 21 in Figure 2 by the action of the springs 24. This moves the slack cable away from the taut cable or from one another if both are slack, preventing the same from tangling.

When both cables are taut the arm 21 is lowered to the broken line position, together with the cable 17. Whenever either cable is in a taut condition the said cable will be in alignment with the sheaves 15 and when either cable is slacked off the arm 21 or 22 will be moved outwardly, separating the loose cable from the one remaining in a taut condition, or in the event both cables are slacked off, both arms will remove the cables from one another, preventing their wrapping around each other.

A transverse shaft or bolt 29 bridges the side plates 18 and has rollers 30 journaled thereon adapted to maintain the cables within the grooves of the sheaves 15 and in alignment with the rollers 27 and 28. Bolt 29 further spaces the side plates 18 apart and in a rigid and assembled position.

In the operation of this new and improved guide for cables, the guide G is adapted to pivot on the shaft 10 to adjust itself to a vertical position with respect to the boom, depending upon the angle that the boom is operated. When both cables are loaded they operate in alignment with their sheaves 15, the position indicated in Figure 2, by the arm 22 in full line and 21 in broken.

When either cable is slacked off the arms 21 and 22 move outwardly by the action of the springs 24 to the position shown by the arm 21 in this view. If both cables would slack off, the arm 22 would assume this position from the opposite side of the boom, moving both cables apart preventing tangling. When the load is applied to either cable it will bring the arms to their vertical position so that the cable will operate over the sheaves in alignment with said sheaves.

What is claimed is:

1. A cable guide for a crane boom having a plurality of sheaves rotatably supported on a shaft disposed at the upper end of said boom with each of said sheaves having a cable threaded therethrough and connected with a working tool, and means connected with said boom for moving a slacked off cable away from a taut cable.

2. A cable guide for a crane boom as defined in claim 1, and means for moving a plurality of slacked off cable away from each other.

3. A cable guide for a crane boom as defined in claim 1, said means being disposed intermediate said sheaves and said working tool.

4. A cable guide for a crane boom as defined in claim 2, said means being disposed intermediate said sheaves and said working tool.

5. A cable guide for a crane boom having a plurality of sheaves rotatably supported on a shaft disposed at the upper end of said boom with each of said sheaves having a cable threaded therethrough and connected with a working tool, a bracket supported on said boom, an arm for each of said sheaves pivotally mounted on said bracket, a roller mounted on each of said arms, said rollers being threaded with the cable of its associated sheave, and resilient means mounted on said bracket and connected with each of said arms for pivoting said arms laterally of said boom when the cable passing over the roller thereof is slacked off.

6. A cable guide for a crane boom as defined in claim 5, said bracket being pivotally mounted on said shaft, and a plurality of rollers rotatably mounted on said bracket, said rollers being adapted to engage said cables for guiding movement through said sheaves.

No references cited.